(12) United States Patent
Wu et al.

(10) Patent No.: US 11,842,662 B2
(45) Date of Patent: Dec. 12, 2023

(54) LIGHT FIELD NEAR-EYE DISPLAY DEVICE FOR AUTOMATICALLY ADJUSTING IMAGE DATA ACCORDING TO CURRENT EYE RELIEF AND METHOD THEREOF

(71) Applicant: Coretronic Corporation, Hsin-Chu (TW)

(72) Inventors: Jui-Yi Wu, Hsin-Chu (TW); Chih Hung Lu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/509,076

(22) Filed: Oct. 25, 2021

(65) Prior Publication Data

US 2022/0375376 A1   Nov. 24, 2022

Related U.S. Application Data

(60) Provisional application No. 63/187,946, filed on May 13, 2021.

(30) Foreign Application Priority Data

Aug. 30, 2021 (CN) .......................... 202111001513.0

(51) Int. Cl.
*G09G 3/02* (2006.01)
*G06T 7/70* (2017.01)
(Continued)

(52) U.S. Cl.
CPC ............. *G09G 3/02* (2013.01); *G02B 3/0056* (2013.01); *G06T 7/70* (2017.01); *G06T 15/06* (2013.01); *G09G 2354/00* (2013.01)

(58) Field of Classification Search
CPC ...... G09G 3/02; G09G 2354/00; G09G 3/003; G02B 3/0056; G02B 27/0075;
(Continued)

(56) References Cited

U.S. PATENT DOCUMENTS 6,580,555 B2   6/2003  Crista
11,132,055 B2 *  9/2021  Jones ...................... G06F 3/013
(Continued)

FOREIGN PATENT DOCUMENTS

CN   109387939   2/2019
CN   110168429   8/2019
(Continued)

OTHER PUBLICATIONS

"Office Action of Taiwan Counterpart Application", dated May 25, 2022, p. 1-p. 8.
(Continued)

*Primary Examiner* — Rodney Amadiz
(74) *Attorney, Agent, or Firm* — JCIPRNET

(57) ABSTRACT

A light field near-eye display device and a light field near-eye display method are provided. The light field near-eye display device includes a processor, a display panel, and a lens module. The processor calculates new ray tracing data based on a current eye relief, preset eye relief data, and preset ray tracing data, and adjusts preset image data according to the new ray tracing data to generate adjusted image data. The display panel is coupled to the processor and emits an image beam according to the adjusted image data. The lens module includes a microlens array and is disposed between the display panel and a pupil. The image beam is incident to the pupil through the lens module and displays a light field image.

16 Claims, 3 Drawing Sheets

(51) Int. Cl.
*G02B 3/00* (2006.01)
*G06T 15/06* (2011.01)

(58) Field of Classification Search
CPC ........ G02B 27/0172; G02B 2027/0123; G06T 7/70; G06T 15/06; G06T 3/20; G06T 3/40; G06T 19/006; G06T 2207/20228; G06F 3/013; H04N 5/22541; H04N 5/33; H04N 13/31; H04N 13/383; H04N 5/2254

See application file for complete search history.

(56) References Cited

U.S. PATENT DOCUMENTS

| | | | |
|---|---|---|---|
| 2017/0205877 A1* | 7/2017 | Qin | G02B 27/0093 |
| 2018/0330652 A1* | 11/2018 | Perreault | G06F 3/013 |
| 2019/0041643 A1 | 2/2019 | Chang et al. | |
| 2020/0211512 A1* | 7/2020 | Sztuk | G09G 5/38 |
| 2022/0373812 A1* | 11/2022 | Wu | G02B 30/27 |

FOREIGN PATENT DOCUMENTS

| | | |
|---|---|---|
| EP | 3625648 | 4/2021 |
| TW | I688254 | 3/2020 |
| TW | I701644 | 8/2020 |

OTHER PUBLICATIONS

"Search Report of Europe Counterpart Application", dated Apr. 20, 2022, p. 1-p. 8.

* cited by examiner

LIGHT FIELD NEAR-EYE DISPLAY DEVICE FOR AUTOMATICALLY ADJUSTING IMAGE DATA ACCORDING TO CURRENT EYE RELIEF AND METHOD THEREOF

CROSS-REFERENCE TO RELATED APPLICATION

This application claims the priority benefit of U.S. provisional application Ser. No. 63/187,946, filed on May 13, 2021 and China application serial no. 202111001513.0, filed on Aug. 30, 2021. The entirety of each of the above-mentioned patent application is hereby incorporated by reference herein and made a part of this specification.

BACKGROUND

Technical Field

The invention relates to a display technology, and particularly relates to a light field near-eye display device and a light field near-eye display method.

Description of Related Art

Light field near-eye displays (LFNEDs) are currently one of display technologies that may resolve vergence-accommodation conflict (VAC), and there may be two frameworks: spatial multiplexing and time multiplexing. The time multiplexing is to use a micro-electromechanical system (MEMS) element to change a position of a virtual image to adjust the clarity of foreground and background. The spatial multiplexing uses a lens array to project a corresponding parallax image on a panel. For example, the lens array is disposed on an organic light-emitting diode (OLED) display to generate a light field image.

Regarding the LFNED, a relative relationship between left and right eyeballs and the optical system is a main system parameter. In a conventional LFNED, the system parameters are fixed values and a system tolerance is used to provide a tolerance error for the left and right eyeballs, where the system parameters may include, for example, an inter-pupillary distance (IPD), an eye box, and an eye relief. In the conventional LFNED, the eye relief is set as a system design and cannot be adjusted in a digital manner. Furthermore, the conventional LFNED adopts mechanical movement to adjust optical variables, and accordingly a change of the eye relief occurs. However, since the mechanical adjustment is, for example, to use a relative position change of an optomechanical structure or adopt adjustment of active elements (e.g., elements with material characteristics, such as liquid or liquid crystal, and the like.), the structural complexity may be increased or the degradation of image quality may be generated.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a light field near-eye display device, which allows users to view light field images with good image quality.

Other objectives and advantages of the invention may be further illustrated by the technical features broadly embodied and described as follows.

In order to achieve one or a portion of or all of the objectives or other objectives, an embodiment of the invention provides a light field near-eye display device including a processor, a display panel, and a lens module. The processor calculates new ray tracing data based on a current eye relief, preset eye relief data, and preset ray tracing data, and adjusts preset image data according to the new ray tracing data to generate adjusted image data. The display panel is coupled to the processor and emits an image beam according to the adjusted image data. The lens module includes a microlens array and is disposed between the display panel and a pupil. The image beam is incident to the pupil through the lens module and displays a light field image.

In order to achieve one or a portion of or all of the objectives or other objectives, an embodiment of the invention provides a light field near-eye display method including steps as follows. New ray tracing data is calculated based on a current eye relief, preset eye relief data, and preset ray tracing data. Preset image data is adjusted according to the new ray tracing data to generate adjusted image data. An image beam is emitted by a display panel according to the adjusted image data. The image beam is incident to a pupil through a lens module including a microlens array. A light field image is displayed.

Based on the above description, the light field near-eye display device and the light field near-eye display method of the invention may automatically adjust the image data according to the current eye relief, so that the display panel may emit the corresponding image beam according to the adjusted image data, so as to provide the light field image with good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
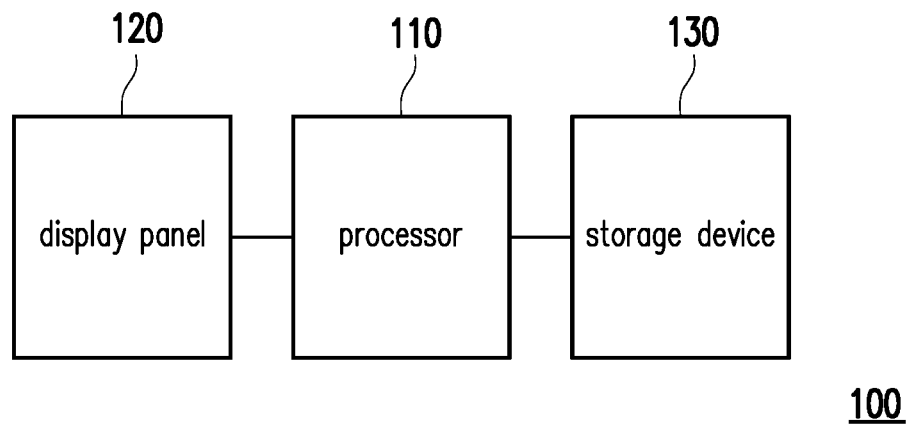
FIG. 1 is a schematic circuit diagram of a light field near-eye display (LFNED) device according to an embodiment of the invention.

FIG. 1 is a schematic circuit diagram of a light field near-eye display (LFNED) device according to an embodiment of the invention. Referring to FIG. 1, the LFNED device 100 includes a processor 110, a display panel 120 and a storage device 130. The processor 110 is coupled to the display panel 120 and the storage device 130. In the embodiment, the processor 110 may generate image data based on the original image data, system parameters, such as preset inter pupillary distance, preset eye box, preset eye relief, preset ray tracing data, etc. The processor 110 may drive the display panel 120 according to the image data, so that the display panel 120 may display image content to emit a corresponding image beam to a pupil of a user, so as to display a light field image. In the embodiment, the LFNED device 100 is, for example, a head-mounted display (HMD), but the invention is not limited thereto.

In the embodiment, the processor 110 may include a central processing unit (CPU) related to a control function, a driving function, and an image data computation function, or other programmable general-purpose or special-purpose microprocessor, a digital signal processor (DSP), an image processing unit (IPU), a graphics processing unit (GPU) a programmable controller, application specific integrated circuits (ASIC), a programmable logic device (PLD), other similar control devices or a combination of these devices. In the embodiment, the storage device 130 may be a memory, and may be used to store related image data, system parameters, image processing modules, and algorithms of related parameter calculations, etc., for the processor 110 to access and execute.

In the embodiment, the display panel 120 may be a liquid crystal display (LCD) panel, an organic light-emitting diode display panel, a micro light-emitting diode display panel, or other suitable displays, and the processor 110 may drive the display panel 120 to display corresponding image frames according to the image data. Moreover, the display panel 120 emits a corresponding image beam to display a light field image due to displaying the corresponding image frame. In the embodiment, the processor 110 may correspondingly adjust the image data according to the current eye relief, so that after the image content displayed on the display panel 120 is adjusted, the light field image may be displayed within a focus range of the pupil of the user.

Figure 2:
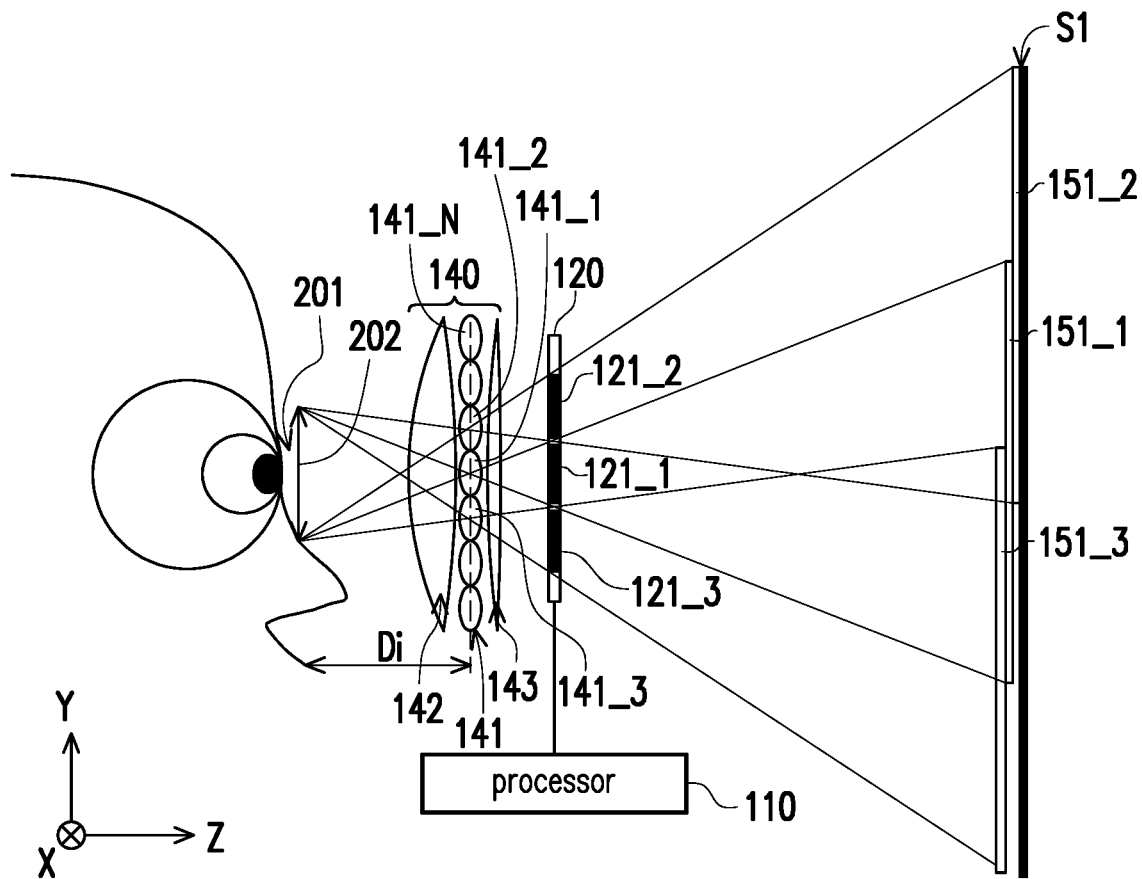
FIG. 2 is a schematic structural diagram of the LFNED device according to an embodiment of the invention.

FIG. 2 is a schematic structural diagram of the LFNED device according to an embodiment of the invention. Referring to FIG. 1 and FIG. 2, in the embodiment, the LFNED device 100 may be arranged in front of a field of view of the user. The LFNED device 100 may further include a lens module 140. An eye (a pupil 201) of the user may face the display panel 120 and the lens module 140 along a direction Z. The display panel 120 and the lens module 140 may be, for example, parallel to a plane formed by respectively extending a direction X and a direction Y. The lens module 140 may include a microlens array 141, and the microlens array 141 may include a plurality of microlenses 141_1-141_N arranged in an array, where N is a positive integer. The microlenses 141_1-141_N may be arranged by respectively extending in the direction X and the direction Y. The lens module 140 may also include other lens elements. In the embodiment, a first lens 142 and a second lens 143 are taken as examples for description, and in other embodiments, the number or shapes of other lens elements may be adjusted according to the image quality and effect to be presented by the LFNED device 100.

In the embodiment, the lens module 140 is disposed between the display panel 120 and the pupil 201, where the image beam generated by the display panel 120 may enter the pupil 201 through the lens module 140 to display a light field image. It should be noted that a result of the light field image (an imaging result on retina of the user) viewed by the user through the pupil 201 may be equivalent to a virtual image imaged on a remote virtual imaging plane S1, and an equivalent optical path of the image beam may be as that shown in FIG. 2.

In the embodiment, from the point of view of the user, within an eye box 202, the pupil 201 of the user may receive an image beam emitted by a sub-display region of the display panel 120 corresponding to a sub-image content 121_1 through the microlens 141_1, so as to observe a sub-virtual image 151_1 equivalently imaged on the remote virtual imaging plane S1. Similarly, within the eye box 202, the pupil 201 of the user may respectively receive image beams emitted by sub-display regions of the display panel 120 corresponding to sub-image content 121_2 and 121_3 through the microlenses 141_2 and 141_3, so as to observe sub-virtual image 151_2 and 151_3 equivalently imaged on the remote virtual imaging plane S1. In this way, positions and overlapping relationships of the multiple sub-image contents displayed by the display panel 120 of the embodiment may be determined according to ray tracing data, so that the user may view the light field image with a three-dimensional object image.

It should be noted that from the equivalent optical path relationship of the image beam of FIG. 2 between the pupil 201 of the user, the microlens array 141, and the display panel 120, it is known that when a current eye relief Di between the pupil 201 and the microlens array 141 is different from a preset eye relief, a plurality of exit pupil positions corresponding to a plurality of light traces on the eye box 202 formed by a plurality of image beams emitted by the display panel 120 by entering the pupil 201 through the microlenses 141_1-141_N may be changed, thereby affecting the image content of the light field image displayed on the pupil 201 of the user. Therefore, in the embodiment, the processor 110 may automatically adjust the corresponding multiple sub-image contents displayed on the display panel 120 according to the current eye relief Di, so that the light field image formed by the multiple image beams emitted to the pupil 201 of the user may be displayed within the focus range of the pupil 201.

Figure 3:
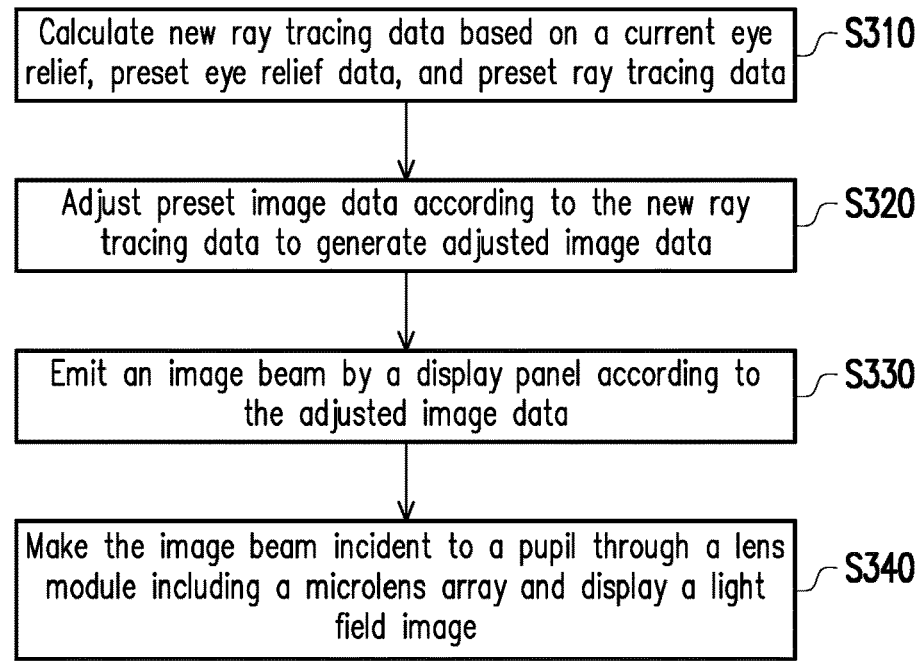
FIG. 3 is a flowchart of an LFNED method according to an embodiment of the invention.

FIG. 3 is a flowchart of an LFNED method according to an embodiment of the invention. Referring to FIG. 1 to FIG. 3, the LFNED device 100 of the embodiment may perform the LFNED method including following steps S310 to S340 to provide a good light field image display effect. It should be noted that in the embodiment, the LFNED device 100 may further include a distance sensor or an input device, where the distance sensor or the input device may be coupled to the processor 110. The distance sensor may automatically sense the user to obtain the current eye relief for the pupil 201 and provide the current eye relief to the processor 110. The current eye relief may be manually input by the user through the input device or input by using other external electronic devices for providing to the processor 110. In the embodiment, the storage device 130 of the LFNED device 100 may be pre-stored with preset eye relief data and preset ray tracing data, and the processor 110 of the LFNED device 100 may, for example, obtain the current eye relief Di from the aforementioned distance sensor or input device.

In step S310, the processor 110 may calculate new ray tracing data according to the current eye relief Di, the preset eye relief data, and the preset ray tracing data. In step S320, the processor 110 may adjust preset image data according to the new ray tracing data to generate adjusted image data. In step S330, the LFNED device 100 may emit an image beam according to the adjusted image data by using the display panel 120. In step S340, the image beam may be incident to the pupil 201 through the lens module 140 including the microlens array 141 and display a light field image. Therefore, the LFNED device 100 of the embodiment and the LFNED method of the embodiment executed by the LFNED device 100 may automatically adjust the image data according to the current eye relief Di, so as to display the light field image suitable for the current eye relief Di. In addition, the method of calculating the new ray tracing data in step S310 will be described in detail in the following embodiments of FIG. 4 and FIG. 5.

Figure 4:
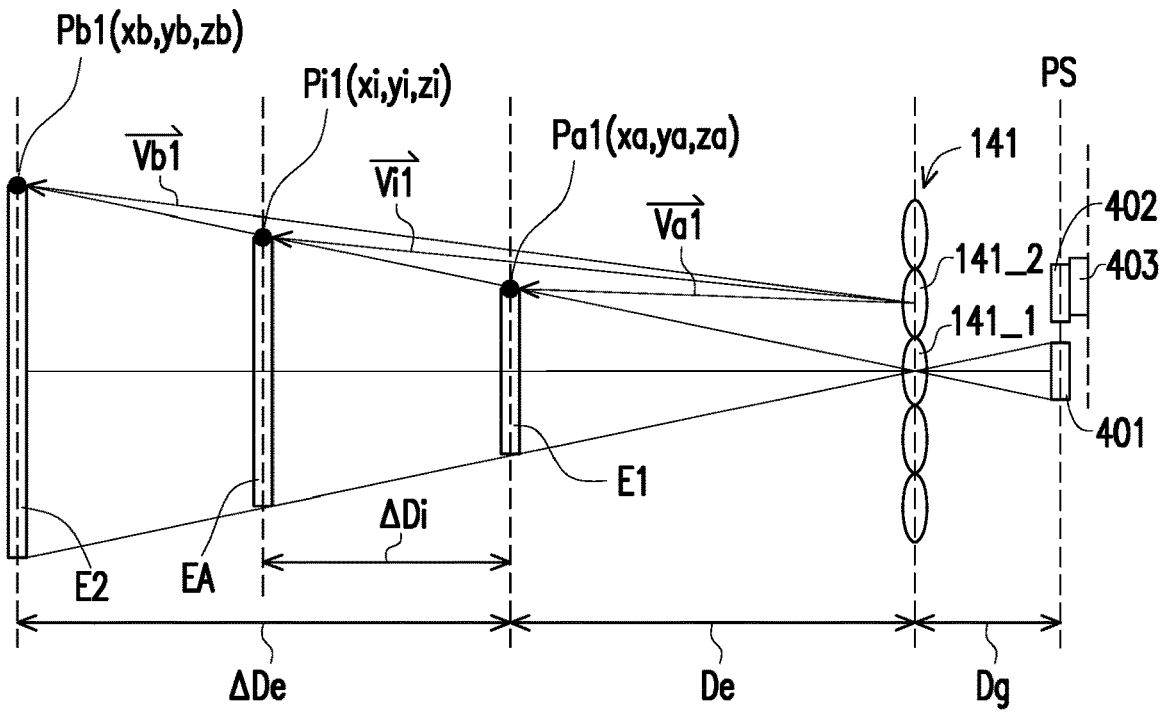
FIG. 4 is a schematic diagram of light paths of different eye reliefs according to an embodiment of the invention.

FIG. 4 is a schematic diagram of light paths of different eye reliefs according to an embodiment of the invention. Referring to FIG. 1, FIG. 2 and FIG. 4, the storage device 120 of the embodiment may pre-store the preset eye relief data and the preset ray tracing data. The preset eye relief data may include a first preset eye relief De between a first eye box E1 and the microlens array 141, or include a second preset eye relief De+ΔDe between a second eye box E2 and the microlens array 140, where the distance ΔDe is a distance between the first eye box E1 and the second eye box E2. It should be noted that the first preset eye relief De and the second preset eye relief De+ΔDe may respectively be the minimum eye relief and the maximum eye relief that the LFNED device 100 may effectively display. There is a distance Dg between the microlens array 141 and a display plane PS of the display panel 120. The preset ray tracing data may include a plurality of first preset exit pupil position coordinates of a plurality of spatial coordinate points in the first eye box E1, or include a plurality of second preset exit pupil position coordinates of a plurality of coordinate points in the second eye box E2. The first preset eye relief De corresponds to the plurality of first preset exit pupil position coordinates and a plurality of first preset ray vectors. The second preset eye relief De+ΔDe corresponds to the plurality of second preset exit pupil position coordinates and a plurality of second preset ray vectors.

In the embodiment, the processor 110 may, for example, calculate a plurality of current exit pupil position coordinates of a plurality of exit pupil positions in a current eye box EA based on a following equation (1), where parameters Pi, Pa, Pb are respectively exit pupil position coordinates (spatial coordinates).

$$\frac{Pi}{De+\Delta Di} = \frac{Pa}{De} = \frac{Pb}{De+\Delta De} \qquad \text{equation (1)}$$

Taking exit pupil position coordinates Pa1(xa,ya,za), Pi1(xi,yi,zi), Pb1(xb,yb,zb) in the first eye box E1, the current eye box EA and the second eye box E2 as an example, the exit pupil position coordinates Pa1(xa,ya,za), Pi1(xi,yi,zi), Pb1(xb,yb,zb) are respectively corresponding exit pupil positions on the first eye box E1, the current eye box EA and the second eye box E2. In this regard, the exit pupil position coordinates Pa1(xa,ya,za) and the exit pupil position coordinates Pb1(xb,yb,zb) are the preset eye relief data (known parameters), and the first preset eye relief De and the second preset eye relief De+ΔDe are known parameters. In this way, when the processor 110 obtains the current eye relief De+ΔDi (i.e., the current eye relief of this moment Di=De+ΔDi), the processor 110 may calculate the current exit pupil position coordinates Pi1(xi,yi,zi) according to the aforementioned equation (1). The distance ΔDi is a distance between the first eye box E1 and the current eye box EA. Therefore, deduced by analogy, the processor 110 may calculate a plurality of current exit pupil position coordinates (new ray tracing data) in the current eye box EA according to the current eye relief De+ΔDi, the first preset eye relief De, and the plurality of first preset exit pupil position coordinates in the first eye box E1, or calculate a plurality of current exit pupil position coordinates (new ray tracing data) in the current eye box EA according to the current eye relief, the second preset eye relief, and the plurality of second preset exit pupil position coordinates in the second eye box E2 to effectively create new ray tracing data for the use of subsequent image data adjustment.

Then, the preset ray tracing data may also include a plurality of first preset ray vectors respectively from respective lens centers of the plurality of microlenses 141_1-141_N to a plurality of exit pupil positions (a plurality of spatial coordinate points) in the first eye box E1, and a plurality of second preset ray vectors respectively from the respective lens centers of the plurality of microlenses 141_1-141_N to a plurality of exit pupil positions (a plurality of spatial coordinate points) in the second eye box E2. In the embodiment, the processor 110 may calculate a plurality of current ray vectors in the new ray tracing data according to the aforementioned obtained plurality of current exit pupil position coordinates in the current eye box EA, the plurality of first preset exit pupil position coordinates, the plurality of second preset exit pupil position coordinates, the plurality of first preset ray vectors, and the plurality of second preset ray vectors. In this regard, the processor 110 may, for example, perform interpolation calculation to obtain the plurality of current ray vectors. In an embodiment, the above interpolation calculation may, for example, adopt a calculation method of interpolation or extrapolation, but the invention is not limited thereto.

The processor 110 may calculate the current ray vector based on a following equation (2), where a parameter h1 is a distance between a current exit pupil position coordinate and the corresponding first preset exit pupil position coordinate, and a parameter h2 is a distance between a current exit pupil position coordinate and the corresponding second preset exit pupil position coordinate. A parameter $\vec{Va}$ a first preset ray vector from a lens center of one microlens to the corresponding first preset exit pupil position, and a parameter $\vec{Vb}$ is a second preset ray vector from a lens center of one microlens to the corresponding second preset exit pupil position.

$$\vec{Vi} = \frac{h2}{h1+h2}\vec{Va} + \frac{h1}{h1+h2}\vec{Vb} \qquad \text{equation (2)}$$

Figure 5:
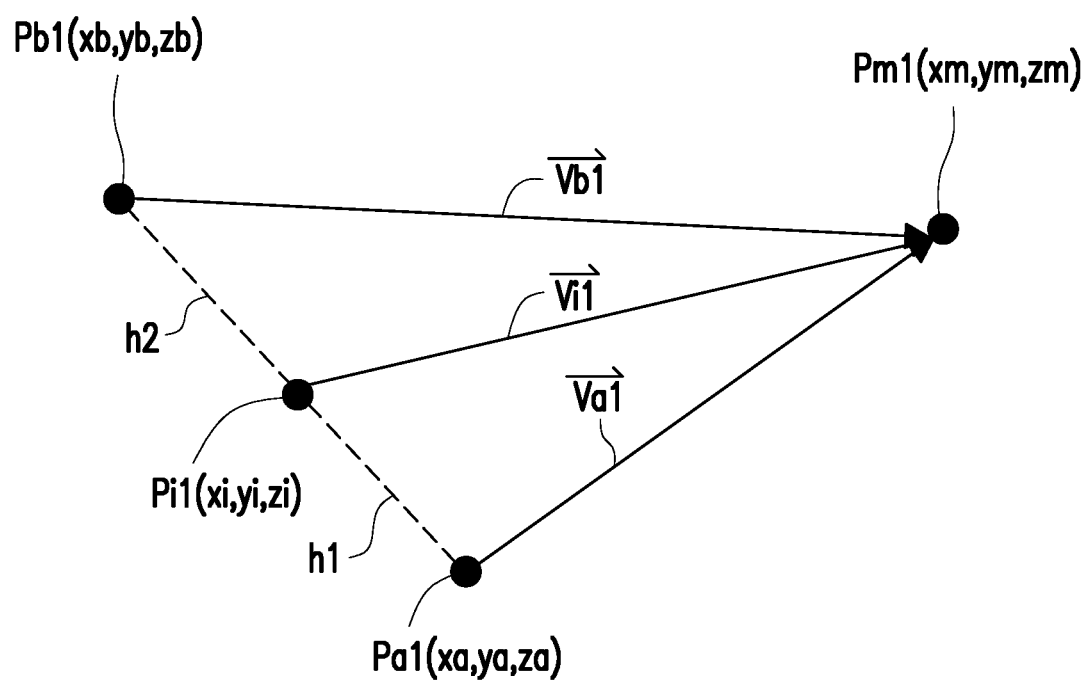
FIG. 5 is a schematic diagram of vector difference calculation according to an embodiment of the invention.

In detail, referring to FIG. 5, FIG. 5 is a schematic diagram of vector difference calculation according to an embodiment of the invention. It should be noted that the equation (2) expresses the calculations of individual microlenses, and regarding the multiple microlenses 141_1-141_N in the microlens array 141, it is necessary to input relevant parameters of each microlens into the equation (2) to calculate, and in FIG. 5, one of the microlenses is taken as an example for description, and the exit pupil position coordinates Pa1(xa,ya,za), Pi1(xi,yi,zi), Pb1(xb,yb,zb) on the first eye box E1, the current eye box EA, and the second eye box E2 are taken as an example for description, and the parameter $\vec{Va}$ in the equation (2) is represented as $\vec{Va1}$, and the parameter $\vec{Vb}$ is represented as $\vec{Vb1}$. The exit pupil position coordinates Pa1(xa,ya,za) and the exit pupil position coordinates Pb1(xb,yb,zb) are the preset eye relief data (known parameters), and the preset ray vector $\vec{Va1}$ and the preset ray vector $\vec{Vb1}$ are respectively preset ray vectors (known parameters) from position coordinates Pm1(xm,ym,zm) of a lens center of one microlens to the exit pupil position coordinates Pa1(xa,ya,za) and the exit pupil position coordinates Pb1(xb,yb,zb). In this way, the processor 110 may calculate a current ray vector $\vec{Vi1}$ from the position coordinates Pm1(xm,ym,zm) of the lens center of one microlens to the exit pupil position coordinates Pi1(xi,yi,zi) according to the aforementioned preset ray vector $\vec{Va1}$, the preset ray vector $\vec{Vb1}$, the parameter h1, the parameter h2, and the equation (2).

Therefore, deduced by analogy, the processor 110 may respectively calculate a plurality of current ray vectors respectively from the plurality of microlenses 140_1-140_N to a plurality of current exit pupil position coordinates in the current eye box EA according to a plurality of current exit pupil position coordinates in the current eye box EA, a plurality of first preset exit pupil position coordinates in the first eye box E1, a plurality of second preset exit pupil position coordinates in the second eye box E2, a plurality of first preset ray vectors and a plurality of second preset ray vectors corresponding to the plurality of microlenses 140_1-140_N of the microlens array 140. In addition, the processor 110 may adjust a plurality of sub-image contents in the preset image data according to the plurality of current ray vectors respectively corresponding to the plurality of microlenses 140_1-140_N, so that a plurality of image beams corresponding to the plurality of sub-image contents respectively form a plurality of sub-light field image units through the plurality of microlenses 140_1-140_N, and the plurality of sub-light field image units form a light field image.

For example, as shown in FIG. 4, the first eye box E1, the current eye box EA, and the second eye box E2 corresponding to the eye reliefs De, De+ΔDi, De+ΔDe may all receive sub-image content 401 displayed by the display panel 120 through the microlens 141_1 located at an exact center position. Namely, regarding the microlens 141_1 located at the exact center position, a position of the sub-image content 401 received by the first eye box E1, the current eye box EA, and the second eye box E2 corresponding to the eye reliefs De, De+ΔDi, De+ΔDe is basically not changed. However, regarding other microlenses that are not located at the exact center position, when the eye relief changes, the position of the sub-image content received by the corresponding eye box is also changed accordingly. For example, regarding the microlens 141_2, a situation that the eye relief De+ΔDe (corresponding to the second eye box E2) is changed to the current eye relief De+ΔDi (corresponding to the current eye box EA) is taken as an example for further explanation.

First, when the LFNED device 100 displays a light field image based on the image data of the second eye box E2 corresponding to the eye relief De+ΔDe, the image beam emitted by a sub-image content 402 displayed on the display panel 120 may be incident to the second eye box E2 located at the eye relief De+ΔDe through the microlens 141_2. Then, when the distance between the pupil and the microlens 141_2 is changed to the current eye relief De+ΔDi, after the aforementioned ray vector adjustment of the invention, the processor 110 may adjust a position of the sub-image content 402 originally displayed on the display panel 120 to a position of a sub-image content 403, so that the image beam emitted by the sub-image content 403 displayed by the display panel 120 after the adjustment may be incident to the current eye box EA (i.e., the current user's pupil) located at the current eye relief De+ΔDi through the microlens 141_2. In addition, it should be noted that the sub-image content 402 and the sub-image content 403 are both displayed on the display plane PS of the display panel 120, and the positions of the sub-image content 402 and the sub-image content 403 shown in FIG. 4 only indicate a result of the position change on the display plane PS.

In summary, the LFNED device and the LFNED method of the invention may automatically adjust the image data and the image content provided by the display panel in the LFNED device according to the current eye relief of the user, so that the display panel may emit the corresponding image beam according to the adjusted image data, and the image beam may be correctly incident to the pupil of the user, so that the light field image may be displayed in the focus range of the pupil. In this way, the user may view the light field image with good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light field near-eye display device, comprising a processor, a display panel, and a lens module, wherein
the processor calculates new ray tracing data based on a current eye relief, preset eye relief data, and preset ray tracing data, and adjusts preset image data according to the new ray tracing data to generate adjusted image data;
the display panel is coupled to the processor and emits an image beam according to the adjusted image data; and
the lens module comprises a microlens array, and the lens module is disposed between the display panel and a pupil, wherein the image beam is incident to the pupil through the lens module and displays a light field image,
wherein the preset eye relief data comprises a first preset eye relief, and the preset ray tracing data comprises first preset exit pupil position coordinates,
wherein the processor calculates current exit pupil position coordinates of the new ray tracing data according to the current eye relief, the first preset eye relief, and the first preset exit pupil position coordinates,
wherein the preset eye relief data further comprises a second preset eye relief, and the preset ray tracing data further comprises second preset exit pupil position coordinates, a first preset ray vector, and a second preset ray vector,
wherein the processor calculates a current ray vector of the new ray tracing data according to the current exit pupil position coordinates, the first preset exit pupil position coordinates, the second preset exit pupil position coordinates, the first preset ray vector, and the second preset ray vector.

2. The light field near-eye display device as claimed in claim 1, wherein the processor performs an interpolation calculation according to the current exit pupil position coordinates, the first preset exit pupil position coordinates, the second preset exit pupil position coordinates, the first preset ray vector, and the second preset ray vector, so as to obtain the current ray vector.

3. The light field near-eye display device as claimed in claim 1, wherein the first preset eye relief and the second preset eye relief are respectively a minimum eye relief and a maximum eye relief.

4. The light field near-eye display device as claimed in claim 1, wherein the current eye relief is a distance between a current eye box corresponding to the pupil and the microlens array, and the current exit pupil position coordinates are located in the current eye box,
wherein the first preset eye relief is a distance between a first preset eye box and the microlens array, and the first preset exit pupil position coordinates are located in the first preset eye box,
wherein the second preset eye relief is a distance between a second preset eye box and the microlens array, and the second preset exit pupil position coordinates are located in the second preset eye box.

5. The light field near-eye display device as claimed in claim 1, wherein the light field image is displayed in a focus range of the pupil.

6. The light field near-eye display device as claimed in claim 1, further comprising:
a distance sensor, coupled to the processor, wherein the processor obtains the current eye relief for the pupil through the distance sensor.

7. A light field near-eye display method, comprising:
calculating new ray tracing data based on a current eye relief, preset eye relief data, and preset ray tracing data;
adjusting preset image data according to the new ray tracing data to generate adjusted image data;
emitting an image beam by a display panel according to the adjusted image data; and
making the image beam incident to a pupil through a lens module comprising a microlens array and displaying a light field image,
wherein the preset eye relief data comprises a first preset eye relief, and the preset ray tracing data comprises first preset exit pupil position coordinates, wherein the step of calculating the new ray tracing data comprises:
calculating current exit pupil position coordinates of the new ray tracing data according to the current eye relief, the first preset eye relief, and the first preset exit pupil position coordinates,
wherein the preset eye relief data further comprises a second preset eye relief, and the preset ray tracing data further comprises second preset exit pupil position coordinates, a first preset ray vector, and a second preset ray vector, wherein the step of calculating the new ray tracing data comprises:
calculating a current ray vector of the new ray tracing data according to the current exit pupil position coordinates, the first preset exit pupil position coordinates, the second preset exit pupil position coordinates, the first preset ray vector, and the second preset ray vector.

8. The light field near-eye display method as claimed in claim 7, wherein the step of calculating the current ray vector of the new ray tracing data comprises:
performing an interpolation calculation according to the current exit pupil position coordinates, the first preset exit pupil position coordinates, the second preset exit pupil position coordinates, the first preset ray vector, and the second preset ray vector, so as to obtain the current ray vector.

9. The light field near-eye display method as claimed in claim 7, wherein the first preset eye relief and the second preset eye relief are respectively a minimum eye relief and a maximum eye relief.

10. The light field near-eye display method as claimed in claim 7, wherein the current eye relief is a distance between a current eye box corresponding to the pupil and the microlens array, and the current exit pupil position coordinates are located in the current eye box,
wherein the first preset eye relief is a distance between a first preset eye box and the microlens array, and the first preset exit pupil position coordinates are located in the first preset eye box,
wherein the second preset eye relief is a distance between a second preset eye box and the microlens array, and the second preset exit pupil position coordinates are located in the second preset eye box.

11. The light field near-eye display method as claimed in claim 7, wherein the light field image is displayed in a focus range of the pupil.

12. The light field near-eye display method as claimed in claim 7, further comprising:
obtaining the current eye relief for the pupil through a distance sensor.

13. A light field near-eye display device, comprising a processor, a display panel, and a lens module, wherein
the processor calculates new ray tracing data based on a current eye relief, preset eye relief data, and preset ray tracing data, and adjusts preset image data according to the new ray tracing data to generate adjusted image data;
the display panel is coupled to the processor and emits an image beam according to the adjusted image data; and
the lens module comprises a microlens array, and the lens module is disposed between the display panel and a pupil, wherein the image beam is incident to the pupil through the lens module and displays a light field image,
wherein the preset eye relief data comprises a first preset eye relief, and the preset ray tracing data comprises first preset exit pupil position coordinates,
wherein the processor calculates current exit pupil position coordinates of the new ray tracing data according to the current eye relief, the first preset eye relief, and the first preset exit pupil position coordinates,
wherein a number of the first preset exit pupil position coordinates is plural, and the processor calculates a plurality of current exit pupil position coordinates of the new ray tracing data according to the current eye relief, the first preset eye relief, and a plurality of first preset exit pupil position coordinates, respectively, and the processor calculates a plurality of current ray vectors from a plurality of microlenses to a plurality of current exit pupil position coordinates in a current eye box according to the plurality of current exit pupil position coordinates, the plurality of first preset exit pupil position coordinates, a plurality of second preset exit pupil position coordinates, and a plurality of first preset ray vectors and a plurality of second preset ray vectors corresponding to a plurality of microlenses of the microlens array, respectively.

14. The light field near-eye display device as claimed in claim 13, wherein the processor adjusts a plurality of sub-image contents in the preset image data according to the plurality of current ray vectors respectively corresponding to the plurality of microlenses, so that a plurality of image beams of the plurality of sub-image contents respectively form a plurality of sub-light field image units through the plurality of microlenses, and the plurality of sub-light field image units form the light field image.

15. A light field near-eye display method, comprising:
calculating new ray tracing data based on a current eye relief, preset eye relief data, and preset ray tracing data;
adjusting preset image data according to the new ray tracing data to generate adjusted image data;
emitting an image beam by a display panel according to the adjusted image data; and
making the image beam incident to a pupil through a lens module comprising a microlens array and displaying a light field image,
wherein the preset eye relief data comprises a first preset eye relief, and the preset ray tracing data comprises first preset exit pupil position coordinates, wherein the step of calculating the new ray tracing data comprises:
calculating current exit pupil position coordinates of the new ray tracing data according to the current eye relief, the first preset eye relief, and the first preset exit pupil position coordinates,
wherein a number of the first preset exit pupil position coordinates is plural, and the step of calculating the new ray tracing data further comprises:
calculating a plurality of current exit pupil position coordinates of the new ray tracing data according to the current eye relief, the first preset eye relief, and a plurality of first preset exit pupil position coordinates, respectively; and
calculating a plurality of current ray vectors from a plurality of microlenses to a plurality of current exit pupil position coordinates in a current eye box according to the plurality of current exit pupil position coordinates, the plurality of first preset exit pupil position coordinates, a plurality of second preset exit pupil position coordinates, and a plurality of first preset ray vectors and a plurality of second preset ray vectors corresponding to a plurality of microlenses of the microlens array, respectively.

16. The light field near-eye display method as claimed in claim 15, wherein the step of adjusting the preset image data according to the new ray tracing data comprises:
adjusting a plurality of sub-image contents in the preset image data according to the plurality of current ray vectors respectively corresponding to the plurality of microlenses,
wherein the step of displaying the light field image comprises:
forming a plurality of sub-light field image units through the plurality of microlenses by a plurality of image beams of the plurality of sub-image contents respectively, and forming the light field image by the plurality of sub-light field image units.

* * * * *